US012591945B1

(12) United States Patent
Lee et al.

(10) Patent No.: US 12,591,945 B1
(45) Date of Patent: Mar. 31, 2026

(54) SYSTEM WITH VORONOI FEATURE TRANSFORM COMPUTATION CIRCUITRY

(71) Applicant: Apple Inc., Cupertino, CA (US)

(72) Inventors: Jinsu Lee, Santa Clara, CA (US); Angie Wang, Atherton, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 18/477,249

(22) Filed: Sep. 28, 2023

(51) Int. Cl.
$G06T\ 1/20$    (2006.01)
$G06T\ 1/60$    (2006.01)
$G06T\ 17/20$    (2006.01)

(52) U.S. Cl.
CPC .................. $G06T\ 1/20$ (2013.01); $G06T\ 1/60$ (2013.01); $G06T\ 17/20$ (2013.01); $G06T\ 2210/52$ (2013.01)

(58) Field of Classification Search
CPC .. G06T 1/20; G06T 1/60; G06T 17/20; G06T 2210/52
USPC .......................................................... 345/423
See application file for complete search history.

(56) References Cited

U.S. PATENT DOCUMENTS

| | | | | |
|---|---|---|---|---|
| 5,430,885 | A | * | 7/1995 | Kaneko ............... G06F 9/30036 712/12 |
| 9,349,189 | B2 | | 5/2016 | Zhang et al. |
| 10,339,664 | B2 | | 7/2019 | Rhoads |
| 10,719,731 | B2 | | 7/2020 | Song et al. |
| 11,276,133 | B2 | | 3/2022 | Kamath |
| 2011/0052023 | A1 | * | 3/2011 | Garg ..................... G06T 11/006 382/294 |
| 2016/0086318 | A1 | * | 3/2016 | Hannuksela .............. G06T 5/50 348/43 |
| 2017/0103503 | A1 | * | 4/2017 | Kim ..................... G11C 11/1673 |
| 2017/0178281 | A1 | * | 6/2017 | Kim ....................... G06F 17/142 |
| 2018/0060997 | A1 | * | 3/2018 | Kim ....................... G06F 17/142 |
| 2018/0158227 | A1 | * | 6/2018 | Reshetov ................. G06T 7/13 |
| 2019/0114832 | A1 | * | 4/2019 | Park ....................... G06T 7/579 |
| 2020/0342042 | A1 | * | 10/2020 | Doraiswamy ........... G06F 16/29 |
| 2021/0182025 | A1 | * | 6/2021 | Shafiee Ardestani ... G06F 17/16 |
| 2023/0147063 | A1 | * | 5/2023 | Kim .......................... G06T 1/20 382/299 |

* cited by examiner

*Primary Examiner* — David T Welch
(74) *Attorney, Agent, or Firm* — Treyz Law Group; Jason Tsai

(57) ABSTRACT
A system or a system-on-a-chip is provided that includes a memory device and a hardware acceleration circuit separate from the memory device and coupled to the memory device via one or more communications paths. The hardware acceleration circuit can include a first processor configured to receive data from the memory device and to process one or more rows of data iteratively or in parallel, an internal memory circuit configured to receive and store processed data output from the first processor, a second processor configured to retrieve the stored data from the internal memory circuit and to process one or more columns of the retrieved data iteratively or in parallel, and a third processor configured to retrieve three-dimensional (3D) data from the memory device and to process one or more stacks of the retrieved 3D data iteratively or in parallel.

17 Claims, 9 Drawing Sheets

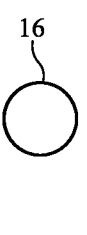
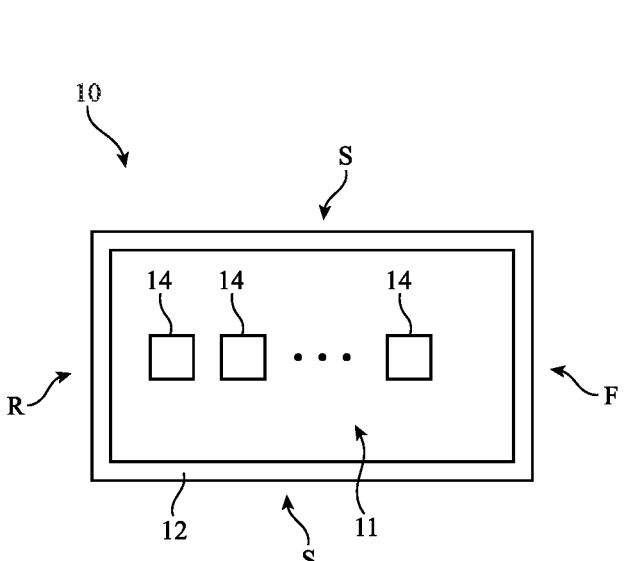
*FIG. 1*

10

CONTROL CIRCUITRY — 26

VORONOI FEATURE
TRANSFORM COMPUTATION
CIRCUITRY — 30

INPUT-OUTPUT DEVICES — 28

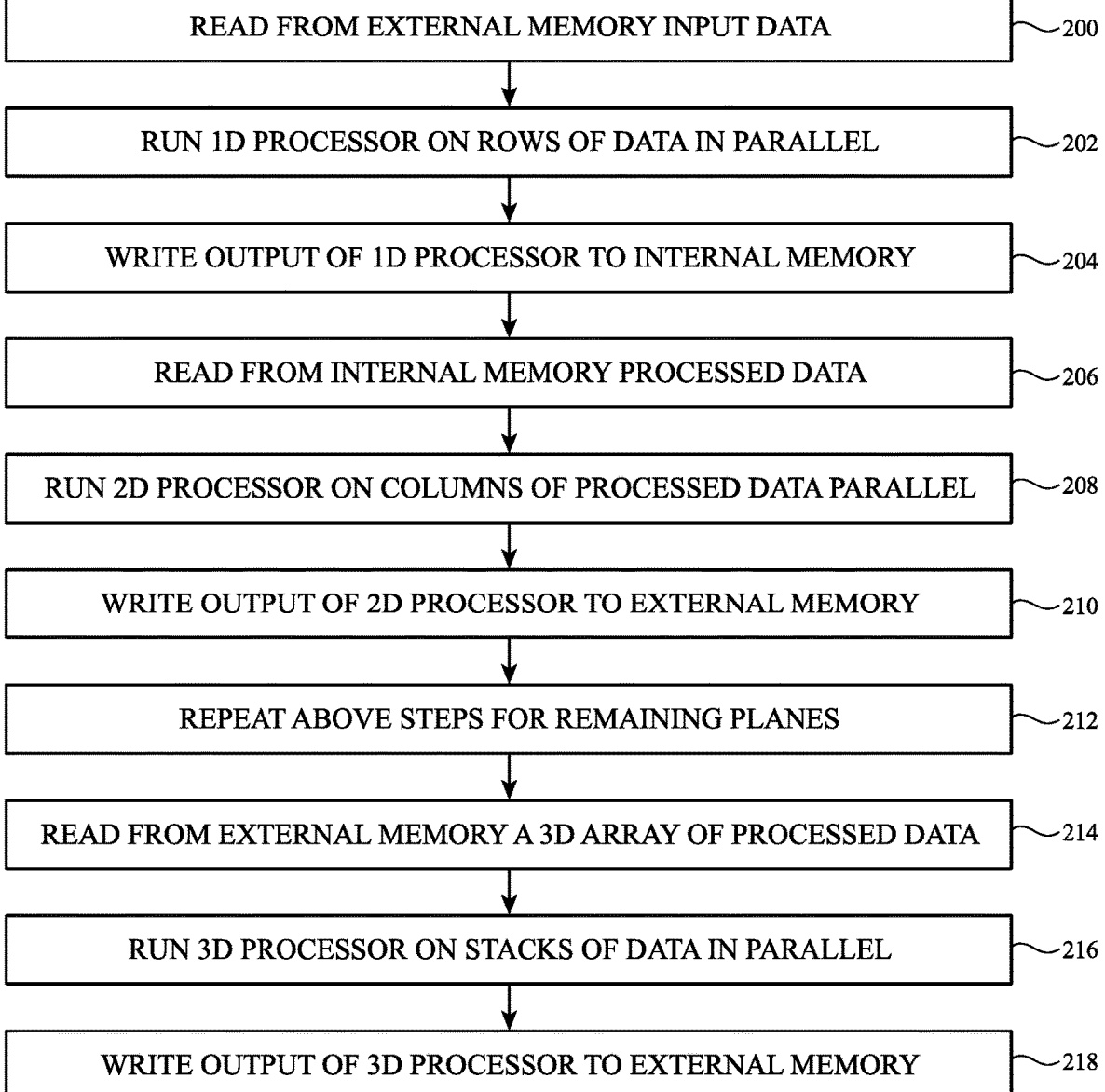

| READ FROM EXTERNAL MEMORY INPUT DATA | 200 |
| RUN 1D PROCESSOR ON ROWS OF DATA IN PARALLEL | 202 |
| WRITE OUTPUT OF 1D PROCESSOR TO INTERNAL MEMORY | 204 |
| READ FROM INTERNAL MEMORY PROCESSED DATA | 206 |
| RUN 2D PROCESSOR ON COLUMNS OF PROCESSED DATA PARALLEL | 208 |
| WRITE OUTPUT OF 2D PROCESSOR TO EXTERNAL MEMORY | 210 |
| REPEAT ABOVE STEPS FOR REMAINING PLANES | 212 |
| READ FROM EXTERNAL MEMORY A 3D ARRAY OF PROCESSED DATA | 214 |
| RUN 3D PROCESSOR ON STACKS OF DATA IN PARALLEL | 216 |
| WRITE OUTPUT OF 3D PROCESSOR TO EXTERNAL MEMORY | 218 |

*FIG. 8*

SYSTEM WITH VORONOI FEATURE TRANSFORM COMPUTATION CIRCUITRY

FIELD

This relates generally to electronic systems, and, more particularly, systems for performing Voronoi feature transform computations.

BACKGROUND

Systems, such as portable computers, wearable devices, vehicles, or other types of electronic devices, may include circuitry for performing Voronoi feature transforms. Circuitry for performing Voronoi feature transforms can be referred to as Voronoi feature transform computation circuitry. It can be challenging to design Voronoi feature transform computation circuitry that can meet real-time performance requirements in low-power systems.

SUMMARY

A system may include a body or a device housing. The system may include Voronoi feature transform computation circuitry on or within the body or housing of the system. An aspect of the disclosure provides a system that includes one or more memory device and a hardware acceleration circuit separate from the one or more memory device and coupled to the one or more memory device via one or more communications paths. The hardware acceleration circuit can include a first processor configured to receive one-dimensional (1D) data, two-dimensional (2D) data, or multiple planes of 2D data from the one or more memory device via the one or more communications paths and to process rows of data in the 1D data, the 2D data, or the multiple planes of 2D data iteratively and/or in parallel, and an internal memory circuit configured to receive and store processed data output from the first processor. The hardware acceleration circuit can further include a second processor configured to retrieve the stored data from the internal memory circuit and to process columns of data in the retrieved data iteratively and/or in parallel, a third processor configured to retrieve three-dimensional (3D) data from the one or more memory device via the one or more communications paths and to process stacks of data in the 3D data iteratively and/or in parallel, and/or additional processors configured to receive one or more additional arrays of data from the one or more memory device via the one or more communications paths and to process portions of data in the one or more additional arrays of data iteratively or in parallel.

An aspect of the disclosure provides a method of operating a system that includes a hardware acceleration circuit coupled to a memory device separate from the hardware acceleration circuit. The method can include reading out one-dimensional (1D) data, two-dimensional (2D) data, or multiple planes of 2D data from the memory device, using a first processor in the hardware acceleration circuit to process rows of pixels in the 1D data, the 2D data, or the multiple planes of 2D data iteratively and/or in parallel and outputting corresponding first processed data, and storing the first processed data on an internal memory circuit in the hardware acceleration circuit or on the memory device separate from the hardware acceleration circuit. The method can further include reading out the stored data from the internal memory circuit or the memory device and using a second processor in the hardware acceleration circuit to process columns of pixels in the data read out from the internal memory circuit iteratively and/or in parallel. The method can further include reading out third-dimensional (3D) data from the memory device or the internal memory circuit and using a third processor in the hardware acceleration circuit to process stacks of pixels in the 3D data iteratively and/or in parallel.

An aspect of the disclosure provides Voronoi feature transform computation circuitry that includes one or more memory device and a hardware acceleration circuit coupled to the one or more memory device. The one or more memory device can be separate from or external to the hardware acceleration circuit. The hardware acceleration circuit can include a one-dimensional (1D) nearest occupied pixel identification processor configured to receive one-dimensional (1D) data, two-dimensional (2D) data, or multiple planes of 2D data from the one or more memory device, an internal memory circuit, a two-dimensional (2D) nearest occupied pixel identification processor configured to receive stored data from the internal memory circuit or the one or more memory device, and a three-dimensional (3D) nearest occupied pixel identification processor configured to receive three-dimensional (3D) data from internal memory circuit or the one or more memory device.

The processed data output from the 1D nearest occupied pixel identification processor can be written to the internal memory circuit or the one or more memory device. The processed data output from the 2D nearest occupied pixel identification processor can be written to the internal memory circuit or the one or more memory device. The processed data output from the 3D nearest occupied pixel identification processor can be written to the internal memory circuit or the one or more memory device. As an example, the 1D processor can read from the memory device and write corresponding processed data to the internal memory circuit, the 2D processor can read from the internal memory circuit and write corresponding processed data to the memory device, and then the 3D processor can read from the memory device and write corresponding processed data to the memory device (see, e.g., the embodiments of FIGS. 3 and 4). As another example, the 1D processor can read from the memory device and write corresponding processed data to the memory device, the 2D processor can read from the memory device and write corresponding processed data to the memory device, and then the 3D processor can read from the memory device and write corresponding processed data to the memory device. As another example, the 1D processor can read from the memory device and write corresponding processed data to the internal memory circuit, the 2D processor can read from the internal memory circuit and write corresponding processed data to the internal memory circuit, and then the 3D processor can read from the internal memory circuit and write corresponding processed data to the memory device. As another example, the 1D processor can read from the memory device and write corresponding processed data to the memory device, the 2D processor can read from the memory device and write corresponding processed data to the internal memory circuit, and then the 3D processor can read from the internal memory circuit and write corresponding processed data to the memory device.

The 2D nearest occupied pixel identification processor and the 3D nearest occupied pixel identification processor can share compute logic. The hardware acceleration circuit can be reconfigured at runtime to perform 1D Voronoi feature transform, 2D Voronoi feature transform, or 3D Voronoi feature transform operations. The 3D data can include X*Y*Z pixels, where integers X, Y, and Z can be one-to-one mapped to a row dimension, a column dimension, and a stack dimension in any order during runtime to optimize for speed and efficiency of the Voronoi feature transform computation circuitry.

BRIEF DESCRIPTION OF THE DRAWINGS

FIG. 1 is a diagram of an illustrative system and an external object in accordance with some embodiments.

FIG. 8 is a flow chart of illustrative steps for operating Voronoi feature transform computation circuitry of the type shown in FIGS. 1-7, where an internal memory circuit of the Voronoi feature transform computation circuitry is configured to store processed data in accordance with some embodiments.

DETAILED DESCRIPTION

Figure 2:
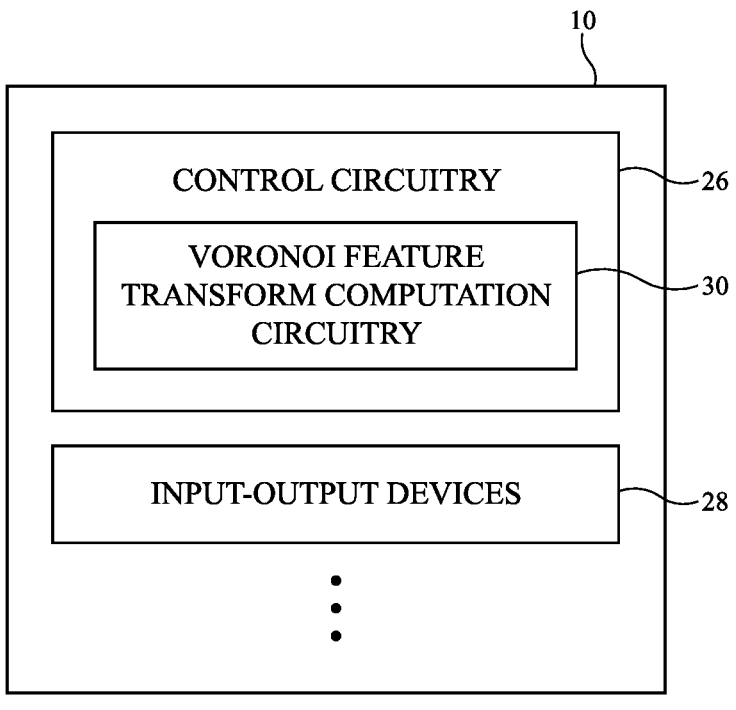
FIG. 2 is a schematic diagram of an illustrative system with Voronoi feature transform computation circuitry in accordance with some embodiments.

FIG. 1 is a cross-sectional top view of an illustrative system 10. System 10 can be any type of electronic device or system that includes electronic circuitry. System 10 can include a device housing or body 12. Housing or body 12 may include structures formed from metal, glass, polycarbonate, and/or other materials. Housing or body 12 may separate an interior region 11 of system 10 from the exterior environment that is surrounding system 10.

System 10 may be provided with one or more input-output components. These components may include displays, speakers, interior and exterior lights, actuators for adjusting the position and motion of structures within system 10, and input devices that gather user input. The input devices may include proximity sensors, touch sensors, force sensors, buttons, etc. Sensors may also be used in system 10 to make measurements on environmental conditions (e.g., ambient light levels, temperatures, etc.). In some configurations, the input-output components may contain wireless circuitry. The wireless circuitry may include ultrawideband (UWB) circuitry, near-field communications circuitry, Bluetooth® circuitry, wireless local area network circuitry, and/or other wireless circuitry. The wireless circuitry may be used to detect nearby devices (e.g., wireless key fobs, portable electronic devices such as wristwatches and cellular telephones emitting UWB signals and/or other short-range wireless signals, etc.).

During operation, user input may be used to operate system 10. The input-output components of system 10 may include buttons, sensors, steering components, and/or other components that serve as controllers for gathering user input to adjust system operations. These input devices may be used for receiving user steering commands, for receiving user input to adjust lighting, media playback, for receiving input to control other system operations, and for receiving other user input. In an illustrative configuration, system 10 includes sensor circuitry (e.g., a touch sensor, force sensor, proximity sensor, and/or other sensor(s)) to receive commands from users.

As shown in FIG. 1, system 10 of FIG. 1 may include components 14. Components 14 may include a controller (also referred to as control circuitry herein) and input-output devices. A controller and/or input-output devices in components 14 may be configured to operate systems based on user input, to run software for controlling lighting, media playback, and/or to support the operation of other system functions. The controller and/or input-output devices (sensor circuitry, other input-output components, etc.) may include processing circuitry and storage and may be configured to perform operations in system 10 using hardware (e.g., dedicated hardware or circuitry), firmware and/or software. Software code for performing operations in system 10 and other data is stored on non-transitory computer readable storage media (e.g., tangible computer readable storage media) in the control circuitry. Remote storage and other remote-control circuitry (e.g., circuitry on remote servers, etc.) may also be used in storing the software code. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid-state drives), one or more removable flash drives or other removable media, or other storage. Software stored on the non-transitory computer readable storage media may be executed on the processing circuitry of components 14 and/or the processing circuitry of remote hardware such as processors associated with one or more remote servers that communicate with components 14 over wired and/or wireless communications links. The processing circuitry may include application-specific integrated circuits with processing circuitry, one or more microprocessors, a central processing unit (CPU) or other processing circuitry.

The input-output components (input-output devices) of components 14 may include displays, sensors, buttons (e.g., sensors based on movable button members that press against switches), light-emitting diodes and other light-emitting devices for providing interior and/or exterior lighting, haptic devices, speakers, actuators, and/or other components, and/or other devices such as input devices for gathering environmental measurements, information on system operations, and/or user input. The sensors in components 14 may include ambient light sensors, touch sensors, force sensors, proximity sensors (e.g., optical proximity sensors and/or capacitive proximity sensors based on self-capacitance sensors and/or mutual capacitance sensor circuitry), optical sensors such as cameras operating at visible, infrared, and/or ultraviolet wavelengths (e.g., fisheye cameras and/or other cameras), capacitive sensors, resistive sensors, ultrasonic sensors (e.g., ultrasonic distance sensors), microphones, three-dimensional and/or two-dimensional images sensors, radio-frequency sensors such as radar sensors, lidar (light detection and ranging) sensors, position sensors for monitoring location, orientation, and movement, speedometers, satellite positioning system sensors, and/or other sensors. Output devices in components 14 may be used to provide the user with haptic output (e.g., force feedback, vibrations, etc.), audio output, visual output (e.g., displayed content, light, etc.), and/or other suitable output. Components 14 may be mounted in interior region 11 and/or the exterior region and/or may, if desired, be attached to and/or mounted to other portions of body 12.

System 10 may be operated in a physical environment that can also include one or more external objects such as an external object 16. External object 16 can represent any external object that might be in the physical environment surrounding system 10. In accordance with some embodiments, the components 14 that are disposed within the interior region 11 of system 10 or on the body 12 of system 10 can include sensors for obtaining distance, position, and/or location information of system 10 and external object 16 and circuitry for computing a distance between system 10 and external object 16. Such circuitry for computing the distance between system 10 and one or more external objects can be referred to herein as distance computation (calculation) circuitry.

FIG. 2 shows how system 10 may also include components such as control circuitry 26 and input-output devices 28. Control circuitry 26 may be configured to run an application for automatically controlling system 10 and software for controlling system climate control devices, lighting, media playback, sensor operations, and/or other system operations. Control circuitry 26 may include processing circuitry and storage and may be configured to perform operations in system 10 using hardware (e.g., dedicated hardware or circuitry), firmware and/or software. Software code for performing operations in system 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid-state drives), one or more removable flash drives or other removable media, or other storage. Software stored on the non-transitory computer readable storage media may be executed on the processing circuitry of control circuitry 26. The processing circuitry may include application-specific integrated circuits with processing circuitry, one or more microprocessors, a central processing unit (CPU) or other processing circuitry.

Input-output devices 28 may include displays, light-emitting diodes and other light-emitting devices, haptic devices, speakers, and/or other devices for providing output. Output devices may, for example, be used to provide system users and others with haptic output, audio output, visual output (e.g., displayed content, light, etc.), and/or other suitable output. The input-output devices 28 may also include input devices such as buttons, sensors, and other devices for gathering user input, for gathering environmental measurements, for gathering information on system operations, and/or for gathering other information. The sensors may include ambient light sensors, touch sensors (e.g., on a touch-sensitive display or separate from a display), force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, other sensors, position sensors for monitoring location, orientation, and movement, speedometers, and/or other sensors.

During operation, control circuitry 26 may gather information from sensors and/or other input-output devices 28 such as lidar data, ultrasonic sensor data, camera data (e.g., two-dimensional images), radar data, and/or other sensor data. The information gathered by control circuitry 26 is not limited to sensor data. In other embodiments, control circuitry 26 can obtain offline data such as map data to compute distance to external object(s) known ahead of time and can optionally obtain data from other systems or remote servers.

The input-output devices can also include wireless circuitry (e.g., wireless communications circuitry) and/or other circuitry to support communications with external communications equipment. The wireless communications circuitry may include radio-frequency (RF) transceiver circuitry formed from one or more integrated circuits, power amplifier circuitry, low-noise input amplifiers, passive RF components, transmission lines, and other circuitry for handling RF wireless signals. The radio-frequency transceiver circuitry may transmit and receive wireless signals (sometimes referred to as radio-frequency signals) using one or more antennas. Wireless signals can also be sent using light (e.g., using infrared communications).

Control circuitry 26 may include Voronoi feature transform computation circuitry 30. A Voronoi diagram or feature map is a partition of a region of space (e.g., a line, 2D plane, or 3D volume) into separate regions based on distance to a given set of points. A Voronoi diagram divides a space into regions, where each region contains locations that are closer to a specific point than to any other point in the space. As an example circuitry 30 can be configured to run one or more Voronoi feature transform computation algorithms to find a nearest occupied pixel/voxel (which may represent an object), to estimate the heights along a road surface (e.g., to find the nearest sensed or otherwise known point (e.g., one or more points on maps), which allows for nearest neighbor interpolation of associated heights or other features), to align objects or scenes, to measure distance from any point on a 2D raster/3D grid to the nearest occupied pixel on the 2D raster/3D grid, and/or other distance-related computations. A "voxel" (or "volumetric pixel") may refer to and be defined herein as a three-dimensional pixel representing the contents of a discretized (quantized) volume in a three-dimensional space. In the 2D case, a pixel represents the contents of a discretized (quantized) area. For clarity and simplicity, all data points whether they are part of a 1D array of inputs, 2D array of inputs, or 3D array of inputs will be referred to herein as "pixels."

As examples, circuitry 30 or other processing components in control circuitry 26 can be configured or programmed to perform feature transform computations, Euclidean distance transform computations and/or other types of feature or distance transform computations that are separable. Voronoi feature transform computation circuitry 30 that uses distance as a label is sometimes referred to herein as a Euclidean distance transform processor. Here, "separable" means that rows, columns, and stacks of data along up to three orthogonal dimensions can be processed independently. Circuitry 30 is therefore sometimes referred to herein as distance transform computation (calculation) circuitry. In general, Voronoi feature transform computation circuitry 30 can be configured to find the nearest or closest occupied input pixel location that is quantized in terms of pixel/voxel distance increments, which can be used to represent an object. For a given space, smaller pixels/voxels can be used to fill the space to achieve better precision or resolution at the expense of higher compute costs. Larger pixels/voxels, on the other hand, can help lower compute costs at the expense of lower precision or resolution. Once the nearest occupied pixel/voxel to each output point/pixel/voxel is found, some feature of the nearest object can then be used to populate each output pixel/voxel. Such feature of the nearest occupied pixel can include distance, color, height, object classification, or other types of information.

The examples above in which Voronoi feature transform computation circuitry 30 is included as part of a system 10 is illustrative. In general, Voronoi feature transform computation circuitry 30 can be included as part of a smart phone, a smart watch, a head-mounted device or other wearable device, a portable computer, a voice-controlled assistant, or other types of electronic devices or computing systems. Moreover, device operations in which Voronoi feature transform computation circuitry 30 is configured to perform feature transform operations for labeling each output data pixel/voxel with some feature associated with the nearest occupied pixel/voxel and Voronoi map based distance transform computations for calculating the distance between each output pixel/voxel and the nearest occupied input pixel/voxel in a raster are sometimes described herein as examples. A feature can be a Euclidean distance or some more general feature such as color, height, label of an object, etc.

Figure 3:
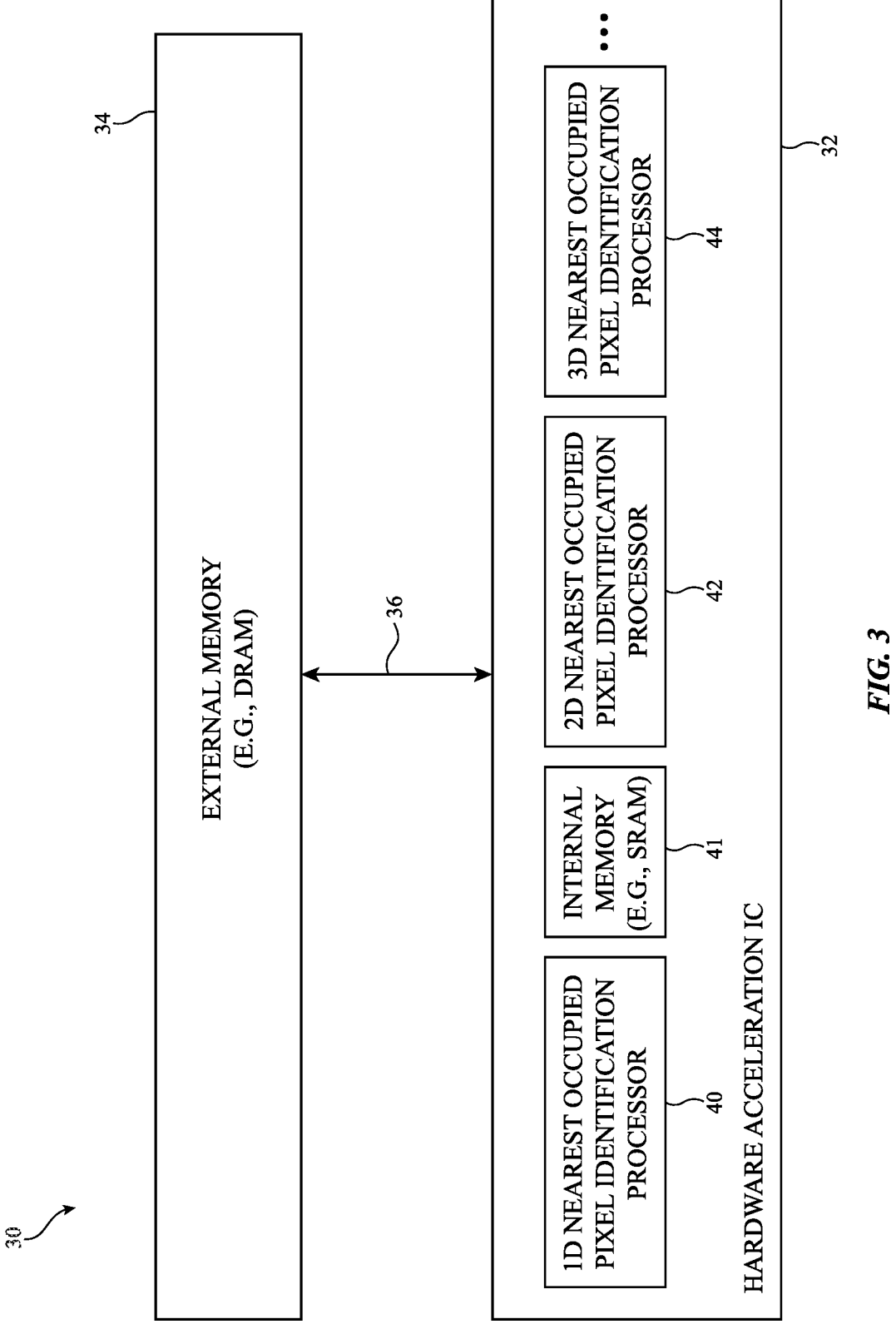
FIG. 3 is a diagram of illustrative Voronoi feature transform computation circuitry that includes a hardware acceleration integrated circuit coupled to an external memory device in accordance with some embodiments.

FIG. 3 is a diagram showing how Voronoi feature transform computation circuitry 30 can include an integrated circuit chip (die) such as hardware acceleration integrated circuit (IC) 32 that is coupled to an external memory device such as external memory 34. This is illustrative. In other embodiments, the Voronoi feature transform computation circuitry 30 can be included as part of an integrated system-on-a-chip that can include other processors such as one or more central processing unit (CPU), one or more graphics processing unit (GPU), and/or other computation/processing units. External memory 34 may be formed from dynamic random-access memory (DRAM) components (as an example). External memory 34 may be formed as part of one or more single in-line memory modules (SIMMs), one or more dual in-line memory modules (DIMMs), or other external memory form factor. In other suitable embodiments, external memory 34 can be implemented using flash memory components, magneto-resistive random-access memory (MRAM) components, phase-change random access memory (PCRAM) components, ferroelectric random-access memory (FeRAM) components, hybrid memory cube (HMC) components, solid-state memory components, or other types of volatile or non-volatile memory. For embodiments in which Voronoi feature transform computing circuitry 30 is implemented as part of an integrated system-on-a-chip (SoC), memory 34 can optionally be included in the SoC, but as a separate memory component outside of the hardware acceleration block 32. This memory component that's not directly tied to the hardware accelerator may be shared with or used by a CPU, GPU, or other processing units on the SoC. This separate memory component can be a cache or a hierarchical memory component with some combination of SRAM and DRAM (as an example). The term "external" memory in this context may just imply that memory 34 is external or separate from the hardware acceleration circuit 32, but memory 34 and hardware acceleration circuit 32 can both be included within the same SoC.

Hardware acceleration IC 30 and external memory 34 may be mounted on a common substrate such as a printed circuit board or a silicon interposer, or stacked using through-silicon vias (TSVs) (e.g., where different dies are stacked vertically with respect to each other), and may communicate with each other via one or more communications path(s) 36 on the printed circuit board. Path(s) 36 may include one or more memory channels for conveying read data and write data and associated read/write access commands between IC 30 and memory 34. For example, hardware acceleration IC 32 may perform read access operations by sending read commands and receiving corresponding data read out from external memory 34 over one or more paths 36 and may perform write access operations by sending write commands and providing corresponding data to be loaded into external memory 34 over one or more paths 36. Read and write operations can occur simultaneously.

As shown in FIG. 3, hardware acceleration IC 32 may include multiple stages of processors such as a first processor 40, a second processor 42, and a third processor 44. The first processor 40 may be a one-dimensional (1D) nearest occupied pixel identification processor with parallel processing units, wherein each individual processing unit is configured to perform feature transform computations sequentially along a first dimension (e.g., along a "row" of pixels). Multiple rows of pixels across one or more planes of data can be processed in parallel. The second processor 42 may be a two-dimensional (2D) nearest occupied pixel identification processor with parallel processing units, where each individual processing unit is configured to perform feature transform computations sequentially along a second dimension (e.g., along a "column" of pixels). When in use, the second processor uses the results from the first processor. Multiple columns of pixels across one or more planes of data can be processed in parallel. The third processor 44 may be a three-dimensional (3D) nearest occupied pixel identification processor with parallel processing units, where each individual processing unit is configured to perform feature transform computations sequentially along a third dimension (e.g., along a "stack" of pixels). When in use, the third processor uses the results from the second processor. Multiple stacks of pixels can be processed in parallel.

Processor 40 can be fed an input of a full 1D, 2D, or 3D raster of pixels or voxels. Each pixel can be denoted as being "occupied" or "empty." For example, processor 40 may be programmed to treat a pixel with a value of "0" or not a number (NaN) as an empty pixel, whereas processor 40 may be programmed to treat a value that is not equal to "0" or not equal to NaN as an occupied pixel. Previous processing (e.g., on a CPU, GPU, or other circuitry on the same system-on-a-chip or "off-chip") may label a pixel, and whether processor 40 associates the label with an occupied or empty pixel is user programmable. An occupied pixel can represent an object. If the input of the hardware acceleration IC 32 is a 3D array of data having X*Y*Z pixels, the 1D, 2D, and 3D processors can process data sequentially in any ordering of the dimensions.

As an example, the 1D processor 40 can process data sequentially along the X dimension; the 2D processor 42 can process data sequentially along the Y dimension using the results of the 1D processor; and the 3D processor 44 can process data sequentially along the Z dimension using the results of the 2D processor. As another example, the 1D processor 40 can process data sequentially along the X dimension; the 2D processor 42 can process data sequentially along the Z dimension; and the 3D processor 44 can process data sequentially along the Y dimension. As another example, the 1D processor 40 can process data sequentially along the Y dimension; the 2D processor 42 can process data sequentially along the X dimension; and the 3D processor 44 can process data sequentially along the Z dimension; and so on. In other words, the term "row" associated with the operation of 1D processor 40 can refer to the X, Y, or Z dimension; the term "column" associated with the operation of 2D processor 42 can refer to the X, Y, or Z dimension but is different than or orthogonal to the row dimension; and the term "stack" associated with the operation of 3D processor 44 can refer to the X, Y, or Z dimension but is different than or orthogonal to the row and column dimensions. Hardware acceleration IC 32 can be configured to support various X/Y/Z, XY/XZ/YZ, and XYZ data aspect ratios up to some worst case maximum X value, maximum Y value, and maximum Z value. The mapping of XYZ to rows, columns, or stacks can be determined during runtime depending on aspect ratio of the input data to optimize for speed, energy efficiency, and minimal required capacity of internal memory 41. As an example, the longest dimension may be mapped to the length of each of the "rows" processed by the 1D processor 40 since the 1D processor 40 performs the fastest computation with the lowest latency.

Each processing unit of the 1D nearest occupied pixel identification processor 40 may be configured to determine, for each output pixel in the current row, a corresponding nearest occupied pixel along said row of pixels in a sequential manner based on 1D distance calculations (e.g., to determine a column index of the nearest occupied pixel/voxel in that row). A "1D distance" can refer to and be defined herein as a 1D Euclidean distance between two points in a single dimension and can be computed via simple subtraction and absolute function operations, or it can refer to another distance formula. If only the 1D feature transform (as opposed to 2D or 3D) is needed, the nearest occupied pixel determined by 1D processor 40 can be later processed to output the distance of such closest pixel/voxel or other feature of the closest pixel/voxel. Processor 40 may include multiple processor units that are configured to process respective rows of pixels across one or more planes of data in parallel. This is merely illustrative.

Each processing unit of the 2D nearest occupied pixel identification processor 42 may receive the processed data output from the 1D processor 40 and may be configured to determine, for each output pixel in the current column, a corresponding nearest occupied pixel within the current plane of pixels in a sequential manner while taking into account the information obtained by the 1D processor 40. The "location," which can be defined by the column and row indices, of the nearest occupied pixel/voxel within the current plane is determined based on the calculated 2D distances. In some embodiments, processing at the 2D processor 42 may not start until the 1D processing has completely finished. Each processing unit of the 2D processor 42 may be configured to determine, for each output pixel, a corresponding nearest occupied pixel for a column of pixels in a sequential manner based on the calculated 2D distances (e.g., to determine a location of the nearest occupied pixel/voxel within a plane associated with the output pixel's row and column). The nearest occupied pixel does not need to lie in the column currently being processed. A "2D distance" can refer to and be defined herein as a 2D Euclidean distance between two points in a 2D plane and can be computed via subtraction, squaring, summing, and square-root operations, or it can refer to another distance formula. The 1D distance computation is much simpler than the 2D distance computation. If only the 2D feature transform (as opposed to 3D) is needed, the nearest occupied pixel determined by 2D processor 42 can be later processed to obtain the distance of the closest pixel/voxel or other feature of such closest pixel/voxel. In particular, the 2D processor 42 may include multiple processor units that are configured to process respective columns of pixels across one or more planes in parallel while taking into account all of the information output from the 1D processor 40.

If the data points to be processed by Voronoi feature transform computation circuitry 30 are 2D data points or pixels, then only the 1D nearest occupied pixel identification processor 40 and the 2D nearest occupied pixel identification processor 42 are needed to process the data points (e.g., 3D nearest occupied pixel identification processor 44 can optionally be omitted or deactivated). If the data points to be processed by Voronoi feature transform computation circuitry 30 are 3D data points or voxels, then all three 1D, 2D, and 3D nearest occupied pixel identification processors are needed to process the 3D data points. For example, each processing unit of the 3D nearest occupied pixel identification processor 44 may receive the processed data output from the 2D processor 42 and determine, in a sequential manner, a corresponding nearest occupied pixel in 3D space for each output pixel along a stack of pixels based on the calculated 3D distances while taking into account the information calculated by processors 40 and 42 (e.g., to determine a location of the nearest occupied pixel/voxel in the 3D space in terms of indices within a column, row, and stack).

In at least some embodiments, processing at the 3D processor 44 may begin after the 2D processing has finished, or the processing at the 3D processor 44 may begin when some portion of the 2D processing output are available. Here, "3D distance" can refer to and be defined herein as a 3D Euclidean distance between two points in a 3D space and can be computed via subtraction, squaring, summing, and square-root operations, or it can refer to another distance formula. The 1D distance computation is also much simpler than the 3D distance computation, and the 3D distance computation uses more terms than the 2D distance computation. The nearest occupied pixel determined by 3D processor 44 can be later processed to obtain the distance of such closest pixel/voxel or other feature of the nearest/closest pixel/voxel. In particular, the 3D processor 44 may include multiple processor units that are configured to process respective stacks of pixels in parallel while factoring in the data output from the 1D and 2D processors.

As described above, Voronoi feature transform computations carried out by circuitry 30 may involve processing by the 1D nearest occupied pixel identification processor 40, by the 1D processor 40 and the 2D processor 42, or by the 1D processor 40, 2D processor 42, and 3D processor 44. As an example, one way to calculate the closest occupied input pixel per output 3D pixel can involve using the 1D processor 40 to perform two (read then write) sets of accesses on the external memory 34 for all pixel locations in XYZ, then using the 2D processor 42 to perform another two (read then write) sets of accesses on the external memory 34 again for all pixel locations, and then using the 3D processor 44 to perform another two (read then write) sets of accesses on the external memory 34 again for all pixel locations. This example assumes that each of the processing units operating in parallel contains enough data registers to store intermediate data along the dimension it is processing, and this example does not consider the post processing step of mapping relevant features of the closest occupied input pixel to the output. Additionally, a 1D nearest occupied pixel processor may write 3× less data than a 3D nearest occupied pixel processor. The 1D processor, at minimum, needs to write the relevant column index of the nearest occupied pixel along rows. The 2D processor, at minimum, needs to write the relevant column and row indices of the nearest occupied pixel along planes. The 3D processor needs to write the relevant indices represent location within a column, row, and stack. Performing at minimum (e.g., when enough per-processing-unit registers are allocated) a total of six sets of external memory accesses, where each set potentially involving more data at higher dimensions, across all 3D pixels in this way can be costly and inefficient.

In the embodiment of FIG. 3, the data read by the 1D processor 40 may thus indicate whether a pixel is occupied or unoccupied. The data that is written by the 1D processor 40 and/or read by the 2D processor 42 may indicate, for each 1D processor output pixel, an x index and/or other information of the nearest occupied pixel within the row associated with the 1D output pixel. The data that is written by the 2D processor 42 and/or read by the 3D processor 44 may indicate, for each 2D processor output pixel, (x,y) indices and/or other information of the nearest occupied pixel within the plane associated with the 2D output pixel. The data that is written by the 3D processor 44 may indicate, for each 3D processor output pixel, (x,y,z) indices and/or other information of the nearest occupied pixel in the 3D space. The final output pixel data after feature extraction may include one or more features associated with the nearest occupied pixel in the 3D space.

In accordance with some embodiments, hardware acceleration IC 32 may further include an internal (on-chip) memory circuit such as internal memory 41 configured to temporarily store information output from the 1D nearest occupied pixel identification processor 40. Internal memory 41 may be coupled between 1D nearest occupied pixel identification processor 40 and 2D nearest occupied pixel identification processor 42. Internal memory 41 may be implemented as a static random-access memory (SRAM) component, as an example. The use of SRAM 41 to store data generated by 1D processor 40 is exemplary. In other embodiments, internal memory 41 can be implemented using buffer circuits, digital registers, embedded flash memory, other types of volatile memory, or other types of on-chip memory. On-chip memory 41 may be configured to store processed data output from the 1D processor 40 and to provide the stored data to the 2D processor 42 to reduce the need for unnecessarily accessing external memory 34. The use of internal memory 41 to buffer information between the 1D and 2D processors can therefore be technically advantageous and beneficial by reducing the total number of external memory accesses while reducing required external memory bandwidth, reducing external memory power consumption, and increasing the memory access speeds between the 1D processor 40 and the 2D processor 42. The use of 1D processor 40, 2D processor 42, and 3D processor 44 is exemplary. The 2D processor 42 and 3D processor 44 are optional and can be omitted or selectively deactivated. In some applications, only the 1D processor 40 is switched into use to perform 1D transformation operations (e.g., to find the closest occupied pixel in each row), and the internal memory 41 will not be used.

The example of FIG. 3 in which hardware acceleration circuit 32 includes 1D processor, 2D processor 42, and 3D processor 44 is illustrative. In other embodiments, hardware acceleration circuit 32 can include one or more additional processors for processing data associated with additional dimensions (e.g., circuit 32 can include a 4D nearest occupied pixel identification processor, a 5D nearest occupied pixel identification processor, a 6D nearest occupied pixel identification processor, etc.). In such cases, at least a subset of processors before the final stage can access the internal memory 41, wherein the number of dimensions support by internal memory 41 depends on the length/size of each dimension relative to the available capacity of memory 41.

Figure 4:
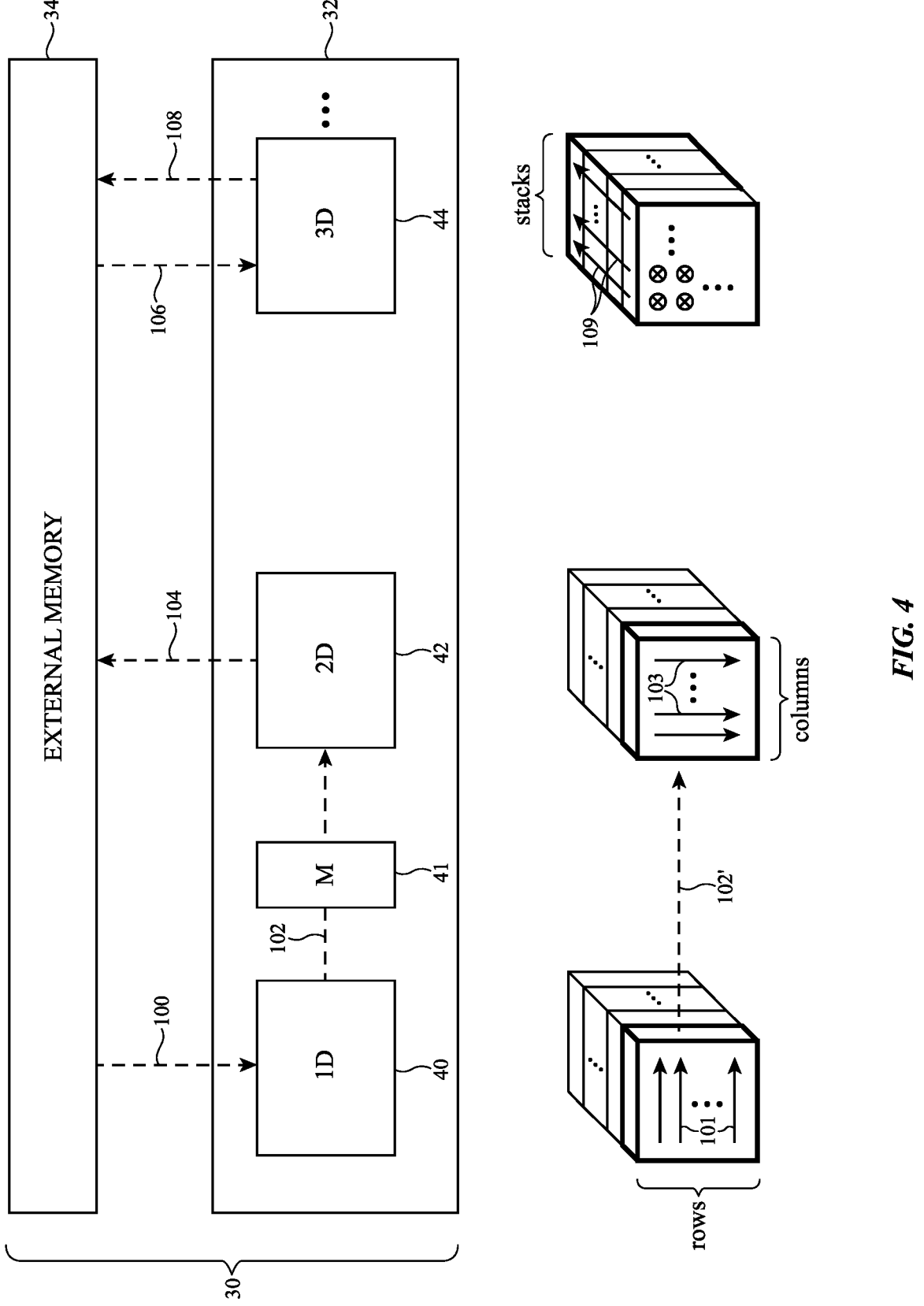
FIG. 4 is a diagram showing how the illustrative Voronoi feature transform computation circuitry of FIG. 3 can include various processors configured to perform one-dimensional (1D) processing, two-dimensional (2D) processing, and/or three-dimensional (3D) processing in accordance with some embodiments.

FIG. 4 is a diagram showing how Voronoi feature transform computation circuitry 30 can use internal memory 41 to buffer data conveyed from the 1D nearest occupied pixel identification processor 40 to the 2D nearest occupied pixel identification processor 42. As shown in FIG. 4. 1D processor 40 can read in rows of data, as shown by arrow 100 while it is performing computations. In the example of FIG. 4, 1D nearest occupied pixel identification processor 40 may include multiple processor units that are configured to process multiple rows of pixels across one or more planes in parallel (see, e.g., parallel arrows 101) while taking into account the results from the prior pre-processing steps. The number of parallel processor units in the 1D processor 40 can be equal to or less than the maximum number of rows per plane (in the case wherein the input includes 2D pixels or 3D voxels, or if it is desired to process multiple independent 1D rows simultaneously) multiplied by a maximum stack height (in the case where the input includes 3D voxels or if it is desired to process multiple independent 2D planes simultaneously). Stack height may be defined as the number of pixels in the third dimension orthogonal to the row and column dimensions. In the scenario where the number of parallel processor units is less than the number of rows per plane multiplied by the stack height, each processing unit can perform multiple iterations until all effective rows have been processed. If the input includes only 2D pixels and it is not desired to process multiple independent planes in parallel, the stack height is equal to one. When stack height is equal to one, 1D processor 40 generates a 2D array of data (e.g., representing column indices of the nearest occupied pixels found in each row) that is temporarily stored on internal memory 41 (see, e.g., arrows 102 and 102').

In some embodiments, the output of the 1D processor 40 can also be written directly to external memory 34. When processing 3D voxels, internal memory 41 can optionally store a number of parallel planes M, where M is any positive integer equal to or less than the stack height. Each plane can include a 2D array of data (e.g., representing column indices). In general, the 1D processor 40 can include M*A parallel 1D processor units, where A is any positive integer equal to or less than the total number of rows in a plane. Similarly, the 2D processor 42 can include M*B parallel 2D processor units, where B is any positive integer equal to or less than the total number of columns in a plane.

The 2D nearest occupied pixel identification processor 42 can then read out the stored data from internal memory 41 and can use multiple processor units to process multiple columns of pixels in parallel (see, e.g., parallel arrows 103). In order to switch from the row-wise processing at 1D processor 40 to the column-wise processing at 2D processor 42, a transpose operation can be performed while reading from internal memory 41 to feed the input of the 2D processor 42. The 2d processor 42 may read data from internal memory 41 while simultaneously performing computations. The number of parallel processor units in 2D processor 42 can be equal to or less than the number of columns per plane multiplied by the stack height (in the case where the input includes 3D voxels or if it is desired to process multiple independent 2D planes simultaneously). In the scenario where the number of parallel processor units in processor 42 is less than the number of columns per plane multiplied by the stack height, the processor units can perform multiple iterations until all effective columns have been processed. For each plane being operated on, this can then result in a 2D array of data (e.g., column and row indices of the nearest occupied pixels in the plane) that is written back to external memory 34 (see, e.g., arrow 104). The output data may be written while the 2D processor 42 is performing computations. This data flow as indicated by arrows 100, 102, and 104 can be repeated for any remaining unprocessed planes.

In the example of FIG. 4, once all of the processing by 2D nearest occupied pixel identification processor 42 is complete, 3D nearest occupied pixel identification processor 44 can then read in a 3D array of data, as shown by arrow 106, and begin its computation. The 3D nearest occupied pixel identification processor 44 may include multiple parallel processor units, each configured to process one or more stacks of pixels (see, e.g., parallel arrows 109) while taking into account the results from the prior processes at the 1D and 2D processors. The number of parallel processor units in 3D processor 44 can be equal to or less than the number of rows multiplied by the number of columns in a plane. Multiple iterations can be performed per processor unit until all stacks have been processed. Meanwhile, the resultant 3D array of processed data (e.g., a location of the nearest occupied pixels represented by the indices within a row, column, and stack) can be written back to external memory 34, as indicated by arrow 108. Operated in this way, the minimum number of external memory accesses is reduced to four XYZ sets (e.g., read access 100, write access 104, read access 106, and write access 108). Memory access operations 106 and 108 can occur while 3D processor 44 is calculating. The example of FIG. 4 in which processors 40, 42, and 44 access one external memory 34 (but potentially at different address locations) is illustrative. In other embodiments, processors 40, 42, and 44 can be configured to access different external memory chips (e.g., 1D processor 40 may read from a first external memory device; 2D processor 42 may write to a second external memory device that may be then read from by the 3D processor 44; and 3D processor 44 may write to yet a third external memory device).

Figure 5:
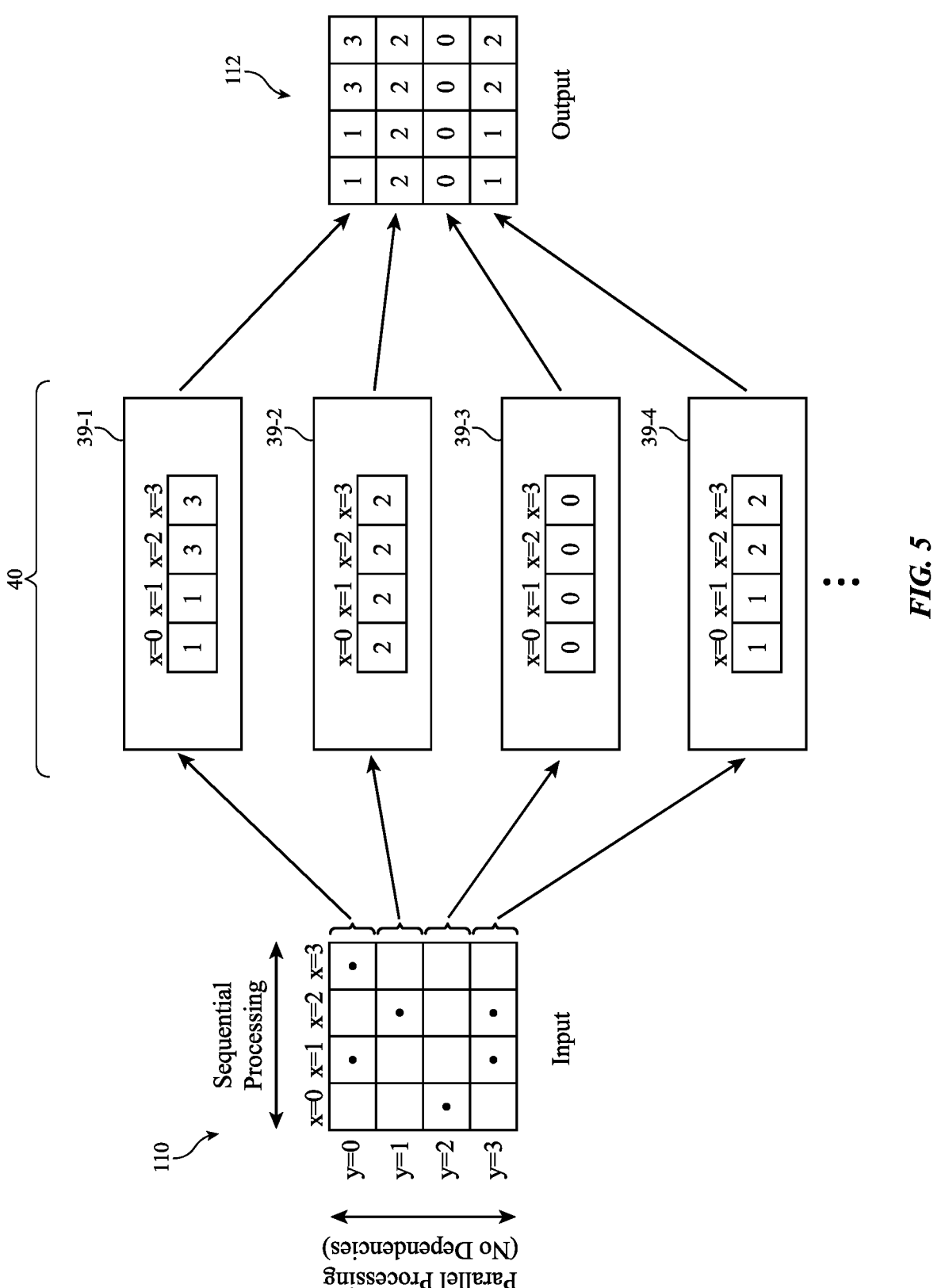
FIG. 5 is a diagram showing how a 1D processor can include multiple processor units configured to process multiple pixel rows with parallelism up to a number of rows in one or more planes in accordance with some embodiments.

FIG. 5 illustrates an example in which 1D nearest occupied pixel identification processor 40 is configured to identify, for each output pixel along a pixel row, the nearest occupied/known input pixel within that row (in a raster). The location (e.g., column index x) of the nearest occupied pixel location within that row will be saved in internal memory 41 rather than saving the associated distance. As shown in FIG. 5, 1D processor 40 may receive one or more rows of input data 110 that is read out from external memory 34 at a time (e.g., the input data may or may not all be read in one go). In the example of FIG. 5, the input data 110 is a 2D array of pixels, where the rows are indexed using different y values and where the columns are indexed using different x values. The occupied pixels are indicated with a dot in FIG. 5, whereas pixels without any dots represent empty pixels. The 1D nearest occupied pixel identification processor 40 may be configured to identify, for each pixel in a row, the nearest occupied pixel within that row. The pixels along each row can be processed in a sequential manner, whereas the different rows of pixels across potentially multiple planes can be processed in parallel. The example of FIG. 5 in which input 110 is a 4×4 array of pixels in a 2D plane is merely illustrative. In general, input 110 may include any number of rows and any number of columns.

In the example of FIG. 5, 1D processor 40 can include a first processor unit 39-1 configured to process the first row of pixels (e.g., the row corresponding to y=0), a second processor unit 39-2 configured to process the second row of pixels (e.g., the row corresponding to y=1), a third processor unit 39-3 configured to process the third row of pixels (e.g., the row corresponding to y=2), and a fourth processor unit 39-4 configured to process the fourth row of pixels (e.g., the row corresponding to y=3).

Turning to the first pixel row as processed by unit 39-1, the x=0 pixel can be assigned a value of "1" since the nearest occupied (non-empty) pixel within the first row is in the x=1 position; the x=1 pixel can also be assigned a value of "1" since the nearest occupied pixel within the first row is in its own position; the x=2 pixel can be assigned a value of "3" since the nearest occupied pixel within the first row is in the x=3 position (assuming the right pixel is given priority when there is a tie for the nearest occupied pixel); and the x=3 pixel can also be assigned a value of "3" since the nearest occupied pixel within the first row is in its own position. Here, the right pixel in a row is given priority, which is exemplary. If desired, the left pixel in a row can be given priority when there is a tie. The direction of priority for the 1D processor 40 can be programmable.

Turning to the second pixel row as processed by unit 39-2, the x=0 pixel can be assigned a value of "2" since the nearest occupied pixel in the second row is in the x=2 position; the x=1 pixel can also be assigned a value of "2" since the nearest occupied pixel in the second row is in the x=2 position; the x=2 pixel can be assigned a value of "2" since the nearest occupied pixel in the second row is in its own position; and the x=3 pixel can also be assigned a value of "2" since the nearest occupied pixel in the second row is in the x=2 position.

Turning to the third pixel row as processed by unit 39-3, the x=0 pixel can be assigned a value of "0" since the nearest occupied pixel in the third row is in its own position; the x=1 pixel can also be assigned a value of "0" since the nearest occupied pixel in the third row is in the x=0 position; the x=2 pixel can also be assigned a value of "0" since the nearest occupied pixel in the third row is in the x=0 position; and the x=3 pixel can also be assigned a value of "0" since the nearest occupied pixel in the third row is in the x=0 position.

Turning to the fourth pixel row as processed by unit 39-4, the x=0 pixel can be assigned a value of "1" since the nearest occupied pixel in the fourth row is in the x=1 position; the x=1 pixel can also be assigned a value of "1" since the nearest occupied pixel in the fourth row is in its own position; the x=2 pixel can be assigned a value of "2" since the nearest occupied pixel in the fourth row is in its own position; and the x=3 pixel can also be assigned a value of "2" since the nearest occupied pixel in the fourth row is in the x=2 position. Each of the processor units 39-1, 39-2, 39-3, and 39-4 can perform computation on a row of pixels sequentially. The example of FIG. 5 in which processor 40 includes four parallel processor units 39-1, 39-2, 39-3, and 39-4 is merely illustrative. In general, 1D nearest occupied pixel identification processor 40 can include any number of processor units 39 to process multiple rows of pixels in parallel. The resulting values (e.g., column or x indices) obtained by each of the processor units 39 can be combined to produce a 2D output array 112 that is stored in internal memory 41 as the processed data becomes available instead of being written back to external memory 34.

Figure 6:
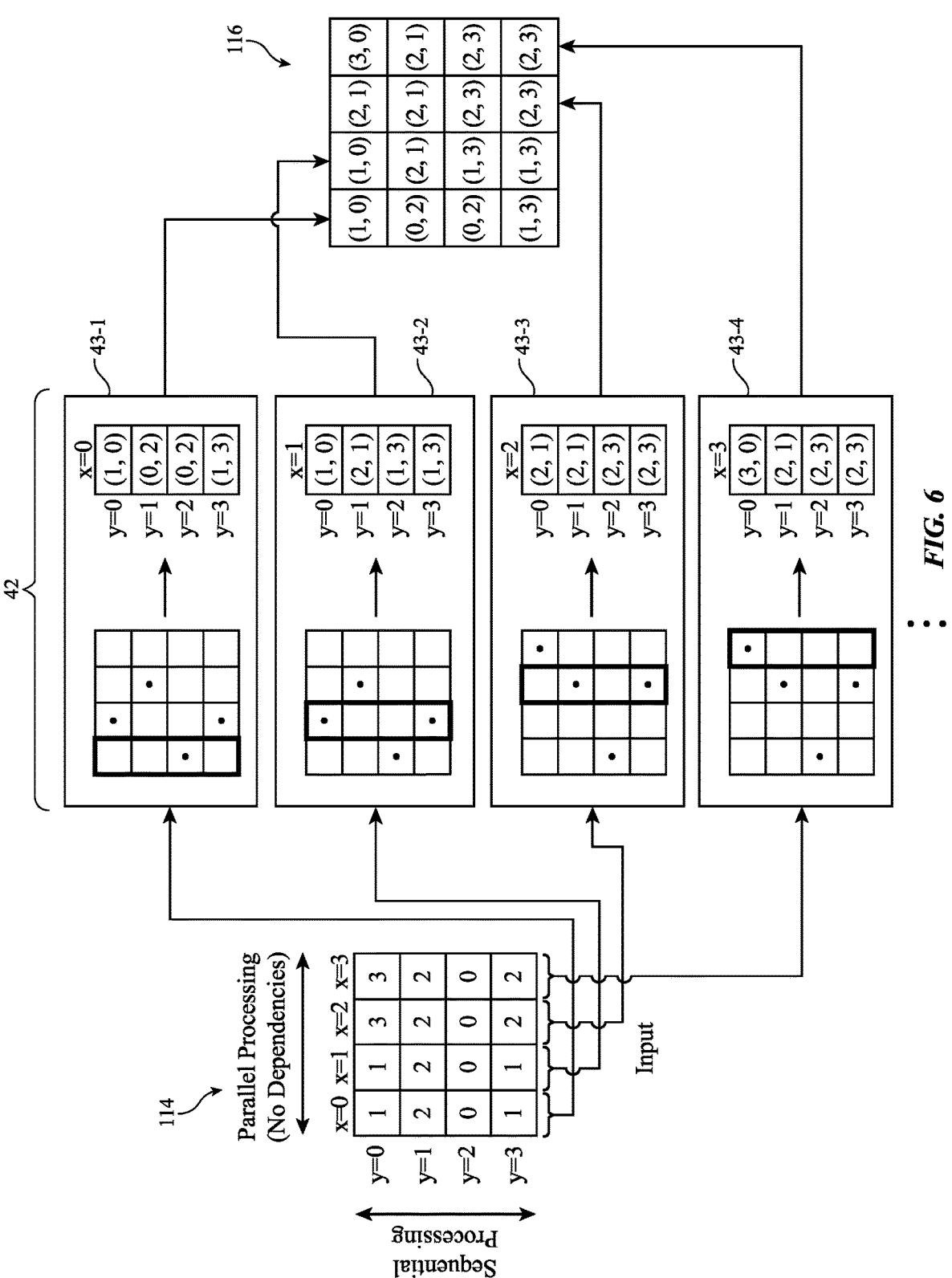
FIG. 6 is a diagram showing how a 2D processor can include multiple processor units configured to process multiple pixel columns with parallelism up to a number of columns in one or more planes in accordance with some embodiments.

FIG. 6 illustrates an example in which 2D nearest occupied pixel identification processor 42 is configured to identify, for each output pixel in a column, a nearest occupied pixel location along a plane while considering the nearest object information obtained by the 1D processor. The nearest occupied pixel along the current plane may not be the overall nearest occupied pixel in the 3D space. The location (e.g., given by column and row indices x and y) of the nearest occupied pixel within that plane will be saved in external memory 34 rather than saving the associated distance. As shown in FIG. 6, 2D processor 42 may receive one or more columns of input data 114 that is read out from internal memory 41 (e.g., the input data may or may not all be read in one go). In the example of FIG. 6, input 114 is equivalent to the output data 112 of FIG. 5. The example of FIG. 6 in which input 114 is a 4×4 array of pixels is merely illustrative. In general, input 114 may include any number of rows and any number of columns.

In the example of FIG. 6, 2D nearest occupied pixel identification processor 40 can include a first processor unit 43-1 configured to process the first column of pixels (e.g., the column corresponding to x=0), a second processor unit 43-2 configured to process the second column of pixels (e.g., the column corresponding to x=1), a third processor unit 43-3 configured to process the third column of pixels (e.g., the column corresponding to x=2), and a fourth processor unit 43-4 configured to process the fourth column of pixels (e.g., the column corresponding to x=3). The pixels along each column can be processed in a sequential manner, whereas the different column of pixels can be processed in parallel as there are no dependencies in the row and stack directions. Computation of 2D distance may be more expensive than computation of 1D distance.

Turning to the first pixel column as processed by unit 43-1, the (0,0) pixel can be assigned a value of "(1,0)" since the nearest occupied pixel within the current 2D plane is in the (x,y)=(1,0) position; the (0,1) pixel can also be assigned a value of "(0,2)" since the nearest occupied pixel in the current plane is in the (x,y)=(0,2) position below; the (0,2) pixel can be assigned a value of "(0,2)" since the nearest occupied pixel in the current plane is in its own position; and the (0,3) pixel can be assigned a value of "(1,3)" since the nearest occupied pixel in the current plane is to its right, assuming priority when there is a tie in the nearest occupied pixel is given to the occupied pixel with the higher y index and not the (0,2) pixel with a lower y index. The direction of priority (e.g., higher or lower y index for the 2D processor 42) can be programmable.

Turning to the second pixel column as processed by unit 43-2, the (1,0) pixel can be assigned a value of "(1,0)" since the nearest occupied pixel in the current plane is in its own position; the (1,1) pixel can also be assigned a value of "(2,1)" since the nearest occupied pixel in the current plane is to its right, assuming priority when there is a tie in the nearest occupied pixel is given to the occupied pixel with the higher y index and not the (1,0) occupied pixel; the (1,2) pixel can be assigned a value of "(1,3)" since the nearest occupied pixel in the current plane is in the (x,y)=(1,3) position below, assuming priority when there is a tie in the nearest occupied pixel is given to the occupied pixel with the higher y index and not the (0,2) pixel to its left; and the (1,3)

pixel can also be assigned a value of "(1,3)" since the nearest occupied pixel in the current plane is in its own position.

Turning to the third pixel column as processed by unit 43-3, the (2,0) pixel can be assigned a value of "(2,1)" since the nearest occupied pixel in the current plane is in the (x,y)=(2,1) position below, assuming priority is given to the occupied pixel with the higher y index and not the two pixels (1,0) and (3,0) flanking it from the left (which may be programmed to have the lowest priority, depending on the priority setting of the 1D processor) and right; the (2,1) pixel can also be assigned a value of "(2,1)" since the nearest occupied pixel in the current plane is in its own position; the (2,2) pixel can be assigned a value of "(2,3)" since the nearest occupied pixel in the current plane is in the (x,y)=(2,3) position below, assuming priority is given to the occupied pixel with the higher y index and not the (2,1) pixel; and the (2,3) pixel can also be assigned a value of "(2,3)" since the nearest occupied pixel in the current plane is in its own position.

Turning to the fourth pixel column as processed by unit 43-4, the (3,0) pixel can be assigned a value of "(3,0)" since the nearest occupied pixel in the current plane is in its own position; the (3,1) pixel can also be assigned a value of "(2,1)" since the nearest occupied pixel in the current plane is to its left, assuming priority when there is a tie in nearest occupied pixel is given to the (2,1) pixel with the higher y index as compared to the upper (3,0) pixel; the (3,2) pixel can be assigned a value of "(2,3)" since the nearest occupied pixel in the current plane is in the (2,3) position below and to the left, assuming priority is given to the occupied pixel with a higher y index and not the (2,1) pixel; and the (3,3) pixel can also be assigned a value of "(2,3)" since the nearest occupied pixel in the current plane is to its immediate left. The example of FIG. 6 in which the occupied pixel with the higher y index is given priority when there is a tie along the 2D processing direction is merely illustrative. As another example, the occupied pixel with the lower y index can be given priority when there is a tie. The 2D processor's direction of priority can be configurable or adjusted by the user. Cumulatively, the overall direction of priority (e.g., top-left, top-right, bottom-left, bottom-right, left, right, top, and bottom) can be determined by the 1D and 2D processors' priority settings.

Each of the processor units 43-1, 43-2, 43-3, and 43-4 can perform computation on a column of pixels in sequence. The example of FIG. 6 in which processor 42 includes four parallel processor units 43-1, 43-2, 43-3, and 43-4 is merely illustrative. In general, 2D nearest occupied pixel identification processor 42 can include any number of processor units 43 for pixel columns. As described above, the data processed by 1D processor 40 can be transposed or rearranged prior to being received at 2D processor 42. The resulting values obtained by each of the 2D processor units 43 can be written back to external memory 34 as they become ready or can be combined to produce a corresponding 2D output 116 that is written back to external memory 34 (see, e.g., data flow arrow 104 in FIG. 4).

Figure 7:
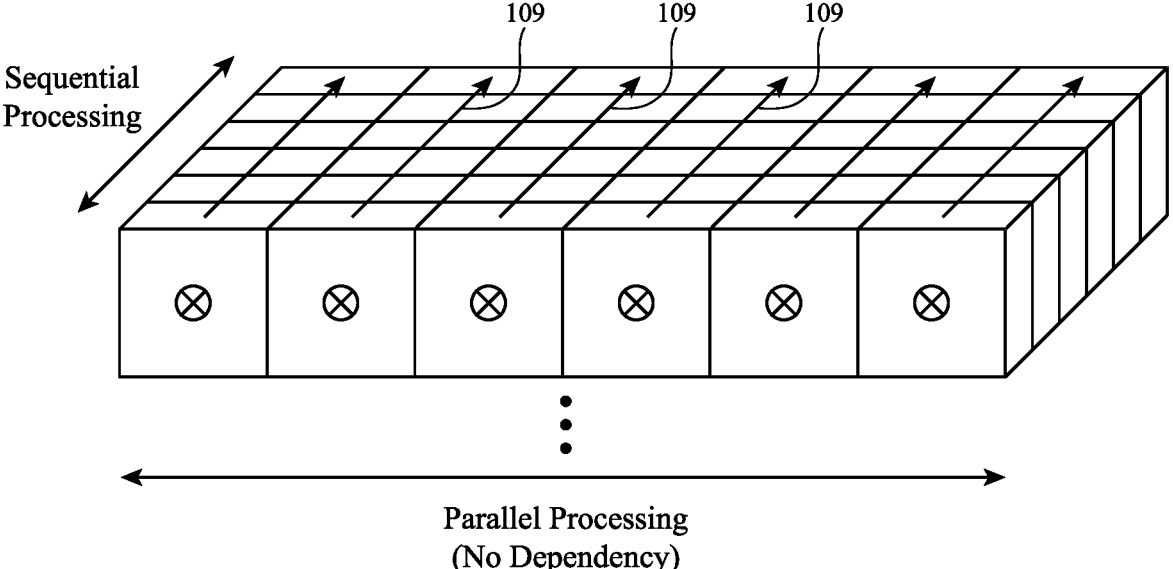
FIG. 7 is a diagram showing how a 3D processor can be configured to process multiple pixel stacks with parallelism up to a number of rows times columns in a 3D voxel array in accordance with some embodiments.

FIG. 7 illustrates how 3D nearest occupied pixel identification processor 44 can be configured to identify, for each pixel along a given stack, a nearest occupied pixel in 3D space (e.g., while considering the nearest object information obtained by the 1D and 2D processors). The location (given by column index x, row index y, and index z along the stack height) of the nearest occupied pixel location in the 3D space will be saved in external memory 34 rather than saving the associated distance. In some embodiments, a post-processing step may save the associated distance or other desired feature of the nearest occupied pixel to external memory 34. The 3D processor 44 may receive input data that is read out from external memory 34 (see, e.g., data flow arrow 106 in FIG. 4). The input data received at 3D processor 44 may be based on or a function of the data output from the 2D processor 42. In general, 3D processor 44 can include any number of processor units configured to process stacks of pixels in parallel, as indicated by arrows 109. The pixels along each stack can be processed in a sequential manner, whereas the different stacks of pixels can be processed in parallel. The resulting values obtained by each of the processor units within 3D processor 44 can be written back to external memory 34 as they become available or can be combined to produce a corresponding 3D output that is written back to external memory 34 (see, e.g., data flow arrow 108 in FIG. 4).

The use of all three processors 40, 42, and 44 as described above is optional. If only 2D transform is required, a more efficient implementation (not shown) may allow the output of the 2D processor 42 to be post-processed so that the target feature of the nearest occupied pixel in each plane is saved directly to external memory 34 rather than first saving the (x,y) location of such pixel to external memory and then performing post-processing. If 3D transform is required.

the 2D processor 42 can output the (x,y) location of the nearest occupied pixel in each plane to external memory 34, while the 3D processor 44 can directly output the target feature associated with the nearest occupied pixel to external memory 34, rather than first outputting its (x,y,z) location and then post-processing. Because the 2D computation logic is a subset of the 3D computation logic, the 3D processor can optionally replace the 2D processor by setting the stack index equal to zero and by properly transposing the output of the 1D processor (e.g., via strided memory access or explicit transpose operation) when feeding the input of the 3D processor. Configured in this way, the compute logic for the 2D and 3D processors can be shared to reduce the total amount of resources within hardware acceleration IC 32. In other embodiments, only 1D transform may be required, where the output of the 1D processor 40 is directly post-processed to save the target feature of the nearest occupied pixel in each row into external memory 34 rather than first saving the pixel location x to external memory 34 and then post-processing.

FIG. 8 is a flow chart of illustrative steps for operating Voronoi feature transform computation circuitry 30 of the type described in connection with FIGS. 1-7. Here, consider a scenario where the data points to be processed includes a 3D array of pixels (voxels) having C columns, R rows, and stack height S (where C, R, and S in memory may map to any ordering of width X pixels, height Y pixels, and depth Z pixels in 3D space). During the steps of block 200, hardware acceleration circuit 30 can read from external memory 34 input data. In particular, the input data can be read out from external memory 34 and conveyed to 1D nearest occupied pixel identification processor 40 (see, e.g., data flow 100 in FIG. 4).

During the steps of block 202, 1D processor 40 can process independent rows of data from the input array (associated with a plane) in parallel. If rows are operated on in parallel, each parallel processor unit may step through and read one input value from external memory 34 along its corresponding row at a time. In particular, the 1D processor 40 can include a plurality of processor units for processing the various rows of data in parallel. If there are not enough parallel processor units to handle all rows in parallel, each processor unit may additionally iterate through some rows in time (not shown). An example of parallel row processes performed by 1D processor 40 is shown in FIG. 5. Although block 202 is shown as occurring after block 200, the reading and 1D computing by processor 40 can occur simultaneously. The 1D processor 40 can generate a corresponding 2D array output for each processed plane (see, e.g., output 112 in FIG. 5) that is then written or stored on internal memory 41, as indicated by the operations of block 204. If desired, multiple planes of data can be processed in parallel using more 1D processing units. Although block 204 is shown as occurring after block 202, the writing in block 204 and 1D computing by processor 40 in block 202 can occur simultaneously.

During the steps of block 206, hardware acceleration circuit 30 can read from internal memory 41 the processed data. For example, the processed data can be read out from internal memory 41 and conveyed to 2D nearest occupied pixel identification processor 42 (see, e.g., data flow 102 in FIG. 4). This processed data that is now being received at the 2D processor 42 may be identical or based on the data output from the 1D processor 40 at blocks 202 and 204. For example, blocks 204 and 206 can refer to the same data but accessed in a transposed/strided manner.

During the steps of block 208, 2D processor 42 can process columns of processed data in parallel. In particular, the 2D processor 42 can include a plurality of processor units for processing the various columns of data in parallel. If there are not enough parallel processor units to handle all columns in parallel, each processor unit may additionally iterate through some columns in time (not shown). An example of parallel column processes performed by 2D processor 42 is shown in FIG. 6. Although block 208 is shown as occurring after block 206, the reading and 2D computing by processor 42 can occur simultaneously. The 2D processor 42 can generate a corresponding 2D array output (see, e.g., output 116 in FIG. 6) for each plane that can then be written to external memory 34, as indicated by the operations of block 210 (see, e.g., data flow arrow 104 in FIG. 4). If desired, multiple planes of data can be processed in parallel using more 2D processing units. Although block 210 is shown as occurring after block 208, the writing in block 210 and 2D computing by processor 42 in block 208 can occur simultaneously.

The steps of blocks 200, 202, 204, 206, 208, and 210 can be repeated for any remaining planes in the overall 3D dataset, as indicated by the operations of block 212. The independent processing along a dimension can be repeatedly performed by iterating through multiple rows/columns over time using multiple parallel row/column processing units, or a combination of the two. Using additional parallel processing units may require more internal memory and compute area.

Once all of the pixels in the XYZ dimensions have been processed by 2D processor 42 and written back to external memory 34, hardware acceleration circuit 30 may read from external memory 34 a 3D array of processed data in a strided fashion different from how the 2D processor output was written, as indicated by the operations of block 214. For example, a data array with C*R*S(=X*Y*Z) pixels can be read out from external memory 34 and conveyed to 3D nearest occupied pixel identification processor 44 (see, e.g., data flow 106 in FIG. 4). This 3D array of data that is now being received at the 3D processor 44 may be identical or based on the data generated by the 2D processor 42. The portion of external memory 34 accessed in block 214 may be different than the portion of external memory 34 accessed during block 200 (e.g., data does not need to be read from or written to "in-place" and block 214 may be faster to access).

During the steps of block 216, 3D processor 44 can process stacks of data in the received 3D data array in parallel. In particular, the 3D processor 44 can include a plurality of processor units for processing the various stacks of data pixels in parallel. If there are not enough parallel processor units to handle all stacks in parallel, each processor unit may additionally iterate through some stacks in time (not shown). An example of parallel stack processes performed by 3D processor 44 is shown in FIG. 7. The 3D processor 44 can generate a corresponding 3D array output that can then be written to external memory 34, as indicated by the operations of block 218 (see, e.g., data flow arrow 108 in FIG. 4). Although block 218 is shown as occurring after block 216, the writing in block 218 and the 2D computing performed by processor 44 in block 216 can occur simultaneously.

The example of FIG. 8 assumes that internal memory 41 can store a single plane (R*C) of data (e.g., pertaining to column indices), where R is equal to the number of rows and where C is equal to the number of columns. This is true if the hardware accelerator is iterating through planes one at a time. If multiple planes M are processed in parallel, then the required capacity of internal memory 41 may be equal to R*C*M.

To further improve the total throughput, a pipeline architecture can optionally be implemented, which would double the size of internal memory 41 (e.g., to 2*M*R*C), where M is any positive integer equal to or less than the stack height. In this pipelining example, a first half of the double-sized internal memory 41 can be referred to as the first pipeline buffer, whereas a second half of the double-sized internal memory 41 can be referred to as the second pipeline buffer. During a first time period, the 1D processor 40 can write 1-4 planes of output data to the first pipeline buffer. During a second time period following the first time period, the 2D processor 42 can read the 1-4 planes of data from the first pipeline buffer while the 1D processor 40 writes 5-8 planes of output data to the second pipeline buffer (since the first pipeline buffer is currently in use by the 2D processor 42). During a third time period following the second time period, the 2D processor 42 can read the 5-8 planes of data from the second pipeline buffer while the 1D processor 40 writes the next 9-12 planes of output data to the first pipeline buffer (since the second pipeline buffer is currently in use by the 2D processor 42). Pipelining can continue to operate in this way by alternating storage of data between the first and second pipeline buffers. Pipelining in this way can help hide the latency of the 1D processor by the latency of the 2D processor, resulting in an overall improvement in processing throughput. The example here assume that's M is equal to 4. In general, M can be equal to 2, 3, 4, 5, 6, 7, 8, 9, 10, greater than 10, or any other positive integer less than or equal to the stack height.

Figure 9:
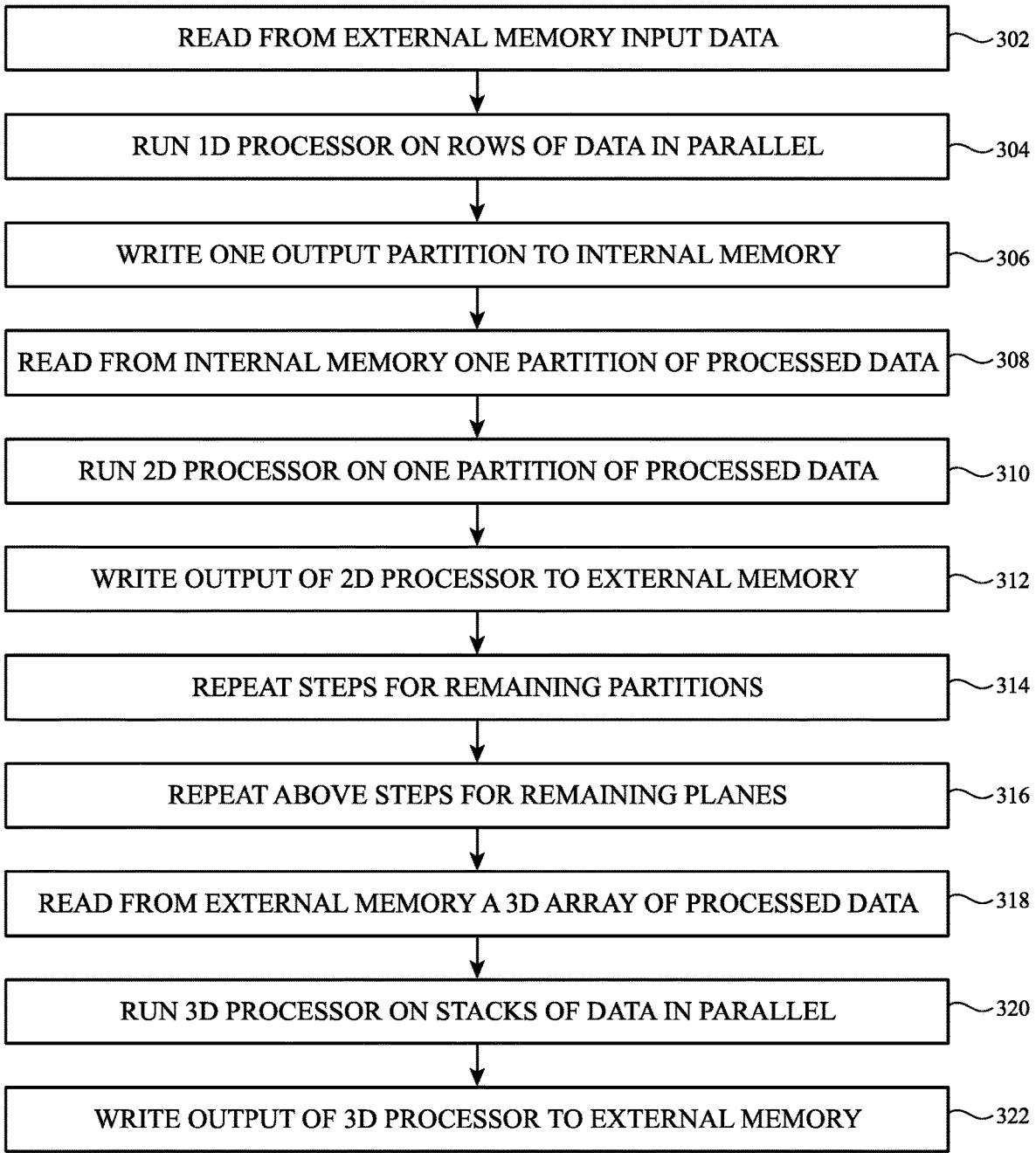
FIG. 9 is a flow chart of illustrative steps for operating Voronoi feature transform computation circuitry of the type shown in FIGS. 1-7, where an internal memory circuit of the Voronoi feature transform computation circuitry is configured to store only a portion of processed data in accordance with some embodiments.

In scenarios where R and C are relatively large numbers (e.g., where R and C are integer in the thousands), the required capacity of internal memory 41 will be large. FIG. 9 shows illustrative operations in accordance with another embodiment where the 2D data output from the 1D processor 40 is partitioned into multiple portions and where only one of the partitioned portions (sometimes referred to as a "partition") is stored on the internal memory 41. The amount of partitioning N depends on the number of parallel compute units available in the 2D processor 42 and the latency of the 1D parallel processing units relative to the 2D parallel processing units. Operating hardware acceleration circuit 30 in this way can be technically advantageous and beneficial to reduce the required size or capacity of the internal (on-chip) memory 41. For example consider an example where the number of partitions N=2. Each processing unit in the 1D processor 40 computes the nearest occupied pixel along a corresponding row. Rather than saving the entire row of data into internal memory 41, only a first half of the row is saved into internal memory 41. This then allows the 2D processor 42 to start working on the first half of the columns in parallel. Afterwards, the 1D processor 40 recomputes the nearest occupied pixel along each row and saves the second half of each row into internal memory 41. By the time this is done, the 2D processor 42 can start working on the second half of the columns. This will be described further in connection with the flow chart of FIG. 9.

FIG. 9 shows an example where each 2D array or plane is divided into N different partitions (portions), where a single partition is stored in internal memory 41 at a time (and may contain column indices of the closest occupied pixels in associated rows). N can be equal to 2, 3, 4, 5-10, 10-20, more than 20, or any other positive integer less than or equal to C, although N should be carefully chosen to balance the size of internal memory 41 versus the acceptable processing latency. During the steps of block 302, hardware acceleration circuit 30 can read from external memory 34 input data. In particular, one or more rows of pixels can be read out from external memory 34 and conveyed to 1D nearest occupied pixel identification processor 40 (see, e.g., data flow 100 in FIG. 4).

During the steps of block 304, 1D processor 40 can process rows of data in parallel. In particular, the 1D processor 40 can include a plurality of processor units for processing the various rows of data in parallel. If there are not enough parallel processor units to handle all rows in a plane in parallel, each processor unit may additionally iterate through some rows in time (not shown). An example of parallel row processes performed by 1D processor 40 is shown in FIG. 5. The 1D processor 40 can generate nearest occupied pixel locations along rows (see, e.g., output 112 in FIG. 5). Here, the output can be divided into N partitions and one of the N partitions is selected to be written and stored on internal memory 41 at a time, as indicated by the operations of block 306. When processing 3D voxels, internal memory 41 can optionally store M such partitions of data, where M corresponds to the number of planes being processed simultaneously and is any positive integer less than or equal to the stack height, and an individual partition contains an R*C/N data portion of a 2D array. This assumes that M planes can be processed simultaneously (e.g., using M*A parallel 1D processing units and using M*B parallel 2D processing units, where A is a positive integer less than or equal to R, and B is a positive integer less than or equal to Cn, where Cn is the number of columns in a partition). When A is less than R and/or when B is less than Cn, parallel processing elements should iterate through some respective rows and/or columns. In some embodiments, the 1D processing units can simultaneously read from external memory 34, compute, and write to internal memory 41 (e.g., when 2D or 3D processing is needed) when the output is valid.

During the steps of block 308, hardware acceleration circuit 30 can read from internal memory 41 the stored data partition(s). For example, a reduced data array with R*C/N pixels (or multiple of such arrays given by M) can be read out from internal memory 41 and conveyed to 2D nearest occupied pixel identification processor 42 (see, e.g., data flow 102 in FIG. 4). The partition(s) of data that is/are now being received at the 2D processor 42 may be identical or based on the data output from the 1D processor 40 at blocks 304 and 306. For example, blocks 306 and 308 can refer to the same partition but accessed in a transposed/strided manner.

During the steps of block 310, 2D processor 42 can process columns of data in the received data partition(s) in parallel. The 2D processor 42 can only start working when all of the required inputs have already been updated by 1D processor 40. In particular, the 2D processor 42 can include a plurality of processor units for processing the various columns of data in parallel. If there are not enough parallel processing units to handle all columns in a partition of a plane, each processor unit may additionally iterate through some columns in time (not shown). An example of parallel column processes performed by 2D processor 42 is shown in FIG. 6. The 2D processor 42 can generate a corresponding output that can then be written to external memory 34, as indicated by the operations of block 312 (see, e.g., data flow arrow 104 in FIG. 4). The 2D processing units can simultaneously read from internal memory 41, compute, and write to external memory 34 when the output is valid.

The steps of blocks 304, 306, 308, 310 and 312 for processing an entire plane (or M planes) of data can be performed a total of N times so that the remaining partitions in the 2D data array(s) are processed by the 2D processor 42, as indicated by the operations of block 314. The steps of blocks 302, 304, 306, 308, 310, 312, and 314 (which process M*N partitions) can be repeated S/M times to handle the remaining 2D arrays in the overall 3D dataset, as indicated by the operations of block 316. The 1D processing is fast, so iterating in this way is not an issue.

Once all of the pixels in the XYZ dimensions have been processed by 2D processor 42 and written back to external memory 34 or some partitions of 2D processing results are available, hardware acceleration circuit 30 can read from external memory 34 a 3D array of processed data (e.g., in a strided fashion different from how the 2D processor output was written), as indicated by the operations of block 318. For example, a data array with C*R*S(=X*Y*Z) pixels, potentially containing column and row indices, can be read out from external memory 34 and conveyed to 3D nearest occupied pixel identification processor 44 (see, e.g., data flow 106 in FIG. 4). This 3D array of data that is now being received at the 3D processor 44 may be identical or based on the data generated by the 2D processor 42.

During the steps of block 320, 3D processor 44 can process stacks of data in the received 3D data array in parallel. In particular, the 3D processor 44 can include a plurality of processor units for processing the various stacks of data pixels in parallel. If there are not enough parallel processing units to handle all stacks, each processor unit may additionally iterate through some stacks in time (not shown). An example of parallel stack processes performed by 3D processor 44 is shown in FIG. 7. The 3D processor 44 can generate a corresponding 3D output that can then be written to external memory 34, as indicated by the operations of block 322 (see, e.g., data flow arrow 108 in FIG. 4). The 3D output can be a grid of voxels, where the contents of each voxel can be a single element (e.g., a distance, color, height, classification, etc.) or multiple elements (e.g., a pixel location having an x index, y index, and z index or multiple targeted features). The 3D processing units can simultaneously read from external memory 34, compute, and write to external memory 34 when the output is valid.

The example described above assumes that internal memory 41 can store a single partition of data per plane (e.g., a total of R*C*M/N pixels). To further improve the total throughput, a pipeline architecture can optionally be implemented, which would double the size of internal memory 41 (e.g., to 2*R*C*M/N). In this pipelining example, a first half of the double-sized internal memory 41 can be referred to as the first pipeline buffer, whereas a second half of the double-sized internal memory 41 can be referred to as the second pipeline buffer. During a first time period, the 1D processor 40 can process 2D planes designated by 1 to M in parallel and write a first partition for each processed plane (e.g., total M*R*C/N worth of data) to the first pipeline buffer. During a second time period following the first time period, the 2D processor 42 can read and process the first partition of each of the planes 1 to M from the first pipeline buffer while the 1D processor 40 processes planes designated by 1 to M in parallel and writes a second partition for each processed plane (e.g., a new set of M*R*C/N worth of data) to the second pipeline buffer, since the first pipeline buffer is currently in use by the 2D processor 42. During a third time period following the second time period, the 2D processor 42 can read the second partition from the second pipeline buffer while the 1D processor 40 processes 2D planes designated by 1 to M in parallel and writes a third partition for each processed plane to the first pipeline buffer, since the second pipeline buffer is currently in use by the 2D processor 42. Pipelining can continue to operate in this way by alternating storage of data between the first and second pipeline buffers. Pipelining is continued for remaining partitions (e.g., $4^{th}$, $5^{th}$, . . . , Nth partition) of the first set of 1 to M 2D planes, and then the pipeline steps can be repeated for all partitions of remaining sets of 2D planes (e.g., $1^{st}$, $2^{nd}$, . . . . Nth partition of M+1 to 2*M 2D planes, then $1^{st}$, $2^{nd}$, . . . , Nth partition of 2*M+1 to 3*M 2D planes, then $1^{st}$, $2^{nd}$ . . . , Nth partition of 3*M+1 to 4*M 2D planes, and so on). Pipelining in this way can help hide the latency of the 1D processor by the latency of the 2D processor, resulting in an overall improvement in speed.

The operations of FIGS. 8 and 9 are merely illustrative. In some embodiments, one or more of the described operations may be modified, replaced, or omitted. In some embodiments, one or more of the described operations may be performed in parallel. Processing that can be performed independently can either be performed iteratively (e.g., being processing one plane of data after the previous plane has been processed) or performed in parallel. The former minimizes compute power and area while sacrificing latency and throughput when compared to the latter. In some embodiments, additional processes may be added or inserted between the described operations (e.g., data transpose, feature extraction, etc.). If desired, the order of certain operations may be reversed or altered and/or the timing of the described operations may be adjusted so that they occur at slightly different times. In some embodiments, the described operations may be distributed in a larger system.

The foregoing is merely illustrative and various modifications can be made to the described embodiments. The foregoing embodiments may be implemented individually or in any combination.

What is claimed is:

1. A system comprising:

external memory; and a hardware acceleration circuit coupled to the external memory via one or more communications paths, the hardware acceleration circuit comprising:

a first processor configured to receive one-dimensional (1D) data, two-dimensional (2D) data, or multiple planes of 2D data from the external memory via the one or more communications paths and to process rows of data in the 1D data, the 2D data, or the multiple planes of 2D data iteratively or in parallel;

an internal memory circuit configured to receive and store processed data output from the first processor;

a second processor configured to retrieve the stored data from the internal memory circuit and to process columns of data in the retrieved data iteratively or in parallel, wherein the external memory is configured to receive processed data output from the second processor via the one or more communications paths; and a third processor configured to retrieve three-dimensional (3D) data, including the processed data output by the second processor, from the external memory via the one or more communications paths and to process stacks of data in the 3D data iteratively or in parallel.

2. The system of claim 1, wherein the hardware acceleration circuit further comprises:

one or more additional processors coupled to the external memory and the internal memory circuit, wherein the first, second, third, and additional processors are each configured to:

read from the external memory and to write to the internal memory circuit or the external memory; or read from the internal memory circuit and to write to the internal memory circuit or the external memory.

3. The system of claim 1, wherein the external memory is further configured to receive processed data output from the third processor via the one or more communications paths.

4. The system of claim 3, wherein the external memory comprises dynamic random-access memory (DRAM) or static random-access memory (SRAM) cache components and wherein the internal memory circuit comprises static random-access memory (SRAM) components.

5. The system of claim 1, wherein the first processor is configured to identify, for each output pixel of the first processor in each of the respective rows of data, a location of a nearest occupied pixel within that row, and wherein how a pixel is labeled as occupied or unoccupied is user programmable.

6. The system of claim 5, wherein the second processor is configured to identify, for each output pixel of the second processor in each of the respective columns of data, a location of a nearest occupied pixel within a plane associated with the output pixel of the second processor while taking into account the processed data output from the first processor.

7. The system of claim 6, wherein the third processor is configured to identify, for each output pixel of the third processor in each of the respective stacks of data, a location of a nearest occupied pixel in a three-dimensional (3D) space while taking into account the processed data output from the second processor.

8. The system of claim 6, wherein the hardware acceleration circuit is configured to extract one or more features from the processed data output from the first processor, the second processor, or the third processor, and wherein the extracted feature comprises a feature selected from the group consisting of: a location, a distance, a height, a color, a classification, and a label associated with the nearest occupied pixel calculated by the first, second, or third processor.

9. The system of claim 1, wherein the first processor, the second processor, or the third processor is configured to simultaneously retrieve data, process the retrieved data, and write the processed data into the external memory or the internal memory circuit.

10. The system of claim 1, wherein the internal memory circuit comprises:

first and second pipeline buffers, wherein:

during a first time period, the second processor is configured to read and process data stored in the first pipeline buffer while the first processor is configured to process and write new data into the second pipeline buffer; and during a second time period after the first time period, the second processor is configured to read and process the new data stored in the second pipeline buffer while the first processor is configured to process and write additional data into the first pipeline buffer.

11. A method of operating a system that includes a hardware acceleration circuit coupled to external memory, the method comprising:

reading out one-dimensional (1D) data, two-dimensional (2D) data, or multiple planes of 2D data from the external memory;

with a first processor in the hardware acceleration circuit, processing rows of pixels in the 1D data, the 2D data, or the multiple planes of 2D data iteratively or in parallel and outputting corresponding first processed data;

storing the first processed data on an internal memory circuit in the hardware acceleration circuit or on the external memory;

reading out the stored data from the internal memory circuit or the external memory:

with a second processor in the hardware acceleration circuit, processing columns of pixels in the data read out from the internal memory circuit or the external memory iteratively or in parallel and outputting corresponding second processed data; and writing the second processed data into the internal memory circuit or the external memory; and with a third processor in the hardware acceleration circuit, reading out third-dimensional (3D) data, including the second processed data, from the external memory or the internal memory circuit and processing stacks of pixels in the 3D data iteratively or in parallel and outputting corresponding third processed data.

12. The method of claim 11, further comprising:

writing the third processed data into the external memory.

13. The method of claim 11, wherein storing the first processed data that is generated based on the 2D data or the multiple planes of 2D data on the internal memory circuit comprises storing a selected partition of the first processed data on the internal memory circuit.

14. The method of claim 13, wherein the first processed data is divided into N partitions, wherein the first processor processes the rows of pixels in the 2D data or the multiple planes of 2D data iteratively or in parallel to output the first processed data at least N times, and wherein during each of the N times the first processed data is being output from the first processor, a different respective partition of the N partitions is successively stored into the internal memory circuit.

15. The method of claim 11, wherein the first processor, the second processor, or the third processor is configured to simultaneously retrieve data, process the retrieved data, and write the processed data into the external memory or the internal memory circuit.

16. The method of claim 11, wherein the external memory is further configured to receive the third processed data output from the third processor via the one or more communications paths.

17. The method of claim 11, wherein the first processor is configured to identify, for each output pixel of the first processor in each of the respective rows of data, a location of a nearest occupied pixel within that row, and wherein how a pixel is labeled as occupied or unoccupied is user programmable.

* * * * *